United States Patent [19]
Simundich

[11] Patent Number: 5,865,871
[45] Date of Patent: Feb. 2, 1999

[54] LASER-BASED FORWARD SCATTER LIQUID FLOW METER

[75] Inventor: Thomas M. Simundich, San Pedro, Calif.

[73] Assignee: Laser Metric, Inc., Villa Park, Calif.

[21] Appl. No.: 724,187

[22] Filed: Oct. 1, 1996

[51] Int. Cl.⁶ ................................. G01F 1/00; G01P 3/36
[52] U.S. Cl. ................................................. 73/861; 356/28
[58] Field of Search ........................ 73/861; 250/356.1; 356/28, 28.5

[56] References Cited

U.S. PATENT DOCUMENTS

| | | | |
|---|---|---|---|
| 3,675,029 | 7/1972 | Iten et al. | 356/28 |
| 3,808,886 | 5/1974 | Goldsberry . | |
| 3,825,346 | 7/1974 | Rizzo | 356/28.5 |
| 3,832,059 | 8/1974 | Iten | 356/28 |
| 4,195,931 | 4/1980 | Hara . | |
| 4,201,467 | 5/1980 | Hartmann . | |
| 4,238,825 | 12/1980 | Geery . | |
| 4,454,757 | 6/1984 | Weinstein . | |
| 4,463,354 | 7/1984 | Sears . | |
| 4,528,857 | 7/1985 | Bruner | 73/861.18 |
| 4,548,074 | 10/1985 | Krueter . | |
| 4,558,950 | 12/1985 | Ulrich . | |
| 4,573,352 | 3/1986 | Hurtig . | |
| 4,624,561 | 11/1986 | Exton | 356/28.5 |
| 4,625,565 | 12/1986 | Wada . | |
| 4,658,634 | 4/1987 | Killough . | |
| 4,658,645 | 4/1987 | Petersen, Jr. . | |
| 4,697,922 | 10/1987 | Gunter, Jr. et al. | 356/28.5 |
| 4,735,503 | 4/1988 | Werner . | |
| 4,760,743 | 8/1988 | Clifford et al. | 73/861.06 |
| 4,786,168 | 11/1988 | Meyers et al. | 356/28.5 |
| 4,821,557 | 4/1989 | Beeson . | |
| 4,875,770 | 10/1989 | Rogers . | |
| 4,905,513 | 3/1990 | Burgos . | |
| 4,918,995 | 4/1990 | Pearman . | |
| 5,088,815 | 2/1992 | Garnier . | |
| 5,116,119 | 5/1992 | Brayer . | |
| 5,123,730 | 6/1992 | Holmes . | |
| 5,131,741 | 7/1992 | Zweben | 356/28 |
| 5,159,407 | 10/1992 | Churnside . | |
| 5,170,218 | 12/1992 | Keene . | |
| 5,257,021 | 10/1993 | Cornman . | |
| 5,264,852 | 11/1993 | Marquet . | |
| 5,379,649 | 1/1995 | Kalotay . | |
| 5,526,109 | 6/1996 | Johnson | 356/28.5 |

OTHER PUBLICATIONS

"Use of Scintillations to Measure Average Wind Across a Light Beam", by R.S. Lawrence et al.; Applied Optics, vol. 11, No. 2; Feb. 1972.

"Line of Site Acoustical Probing of Atmospheric Turbulence" by Peter Alexander Mandics, Ph.D. distertation Stanford University , Mar. 1971.

"Wind Velocity Estimation from Spectral Density Moment Estimates of Forward Laser Beam Distortion" by Dennis Charles Braunreiter, Ph. D. disertation. UCLA, 1995.

"A Line–of–Sight Microwave Propogation Experiment for Resolving the Motions and Turbulent Structure of the Atmosphere" by Jeffrey Claude Harp, Ph.D. dissertation, Stanfored University, Aug., 1971.

Finite aperture optical scintillometer for profiling wind and C2n, Ochs and Wang, Applied Optics, vol. 17, No. 23, Dec. 1978.

*Primary Examiner*—Elizabeth L. Dougherty
*Assistant Examiner*—Paul D. Amrozowicz
*Attorney, Agent, or Firm*—Owen J. Bates

[57] ABSTRACT

The invention measures the flow of a liquid by measuring the effect of that flow on a laser beam which travels from a laser source, through the flow, and landing upon a detector oriented to receive that laser source. Interfaces within the flow stream will refract the laser beam and cause variations in strength of the energy reaching the detector. These variations in the forward scatter occur at audio and super audio frequencies. The flow rate is proportional to audio frequency which can be measured and correlated by comparison to known flow rates.

13 Claims, 4 Drawing Sheets

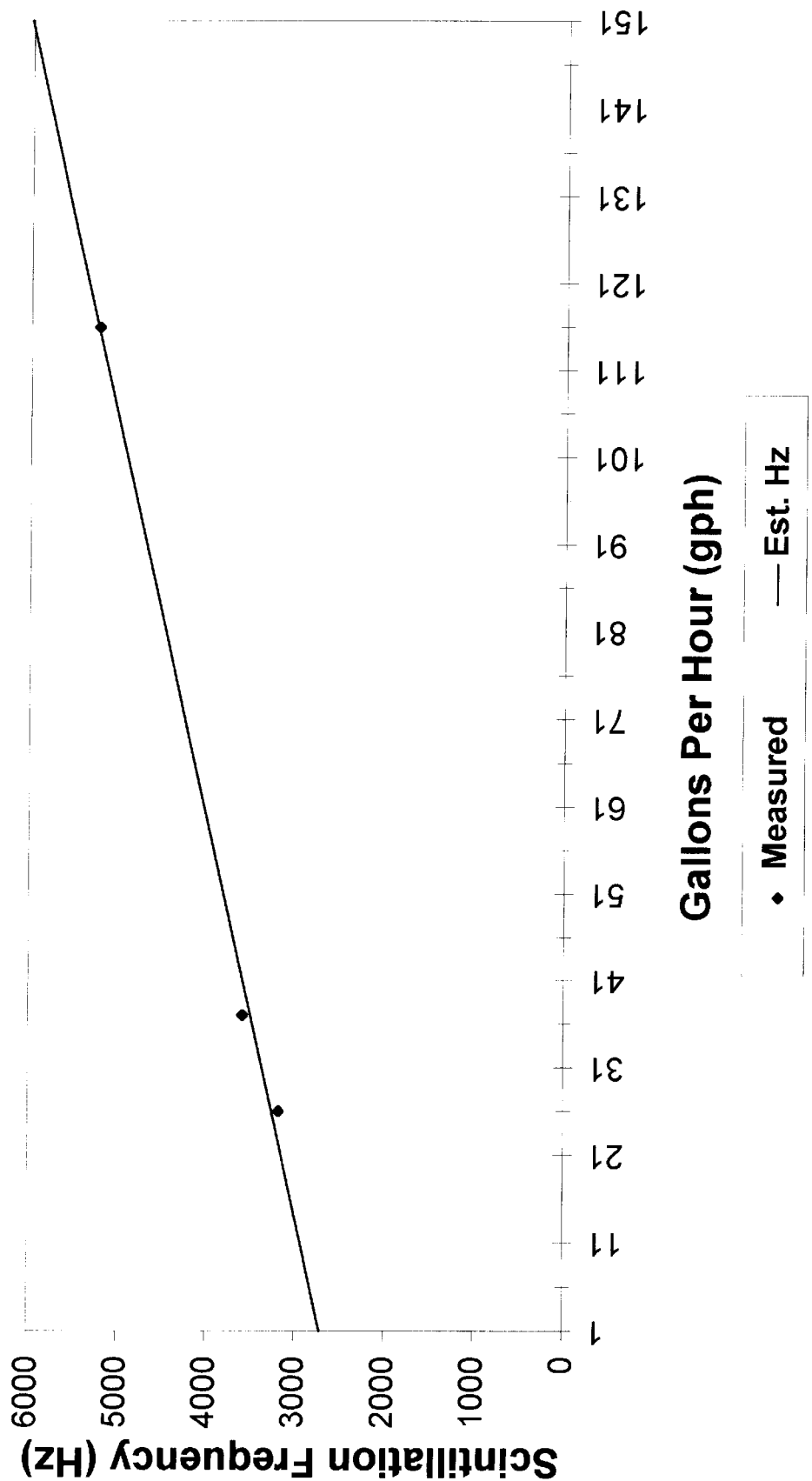

LASER-BASED FORWARD SCATTER LIQUID FLOW METER

This invention relates to an apparatus and a method of measuring the flow of liquids (hereinafter "liquid flow") by measuring the forward scatter of a laser beam directed into the liquid flow, where forward scatter is measured by placing a detector such that the liquid flow is between the laser source and the detector and the detector receives the laser beam after it has impinged the liquid flow. The flow is measured by measuring the zero-crossings, defined as threshold-level crossings at the frequency of the output signal from the detector.

BACKGROUND OF THE INVENTION

Typically, liquid flow meters have been used to measure the flow of liquids in long distance and local distribution pipelines, process transmission lines, and delivery of product to tank trucks and railroad cars for transportation. Because of the value of the product being carried in the pipes, companies have a significant interest in being able to measure accurately the flow of these materials so that actual usage at high flow rate can be monitored and billed.

In addition, proper monitoring of a chemical process requires careful measurement of flows at various stages of the process.

CONVENTIONAL FLOW MEASUREMENT HAS BEEN ACCOMPLISHED BY BOTH MECHANICAL METERS, DOPPLER TECHNOLOGY METERS, HOT WIRE ANEMOMETERS AND CORIOLIS FORCE METER.

A typical mechanical meter operates by directing a flow of liquid past the blades of a turbine to drive a gear train that accumulates and displays the flow as a volume, usually in cubic feet. Although such meters do not directly measure precise volume, they often measure some other characteristic such as linear flow rate. Although it is the linear flow rate which is being directly measured, it is the total volume relationship to the flow which is adequate in many cases. Mechanical meters are usually expensive and require significant additional fittings and supporting hardware in order to operate properly.

Mechanical meters are problematic in several regards. First, the physical inertia of the turbine and gear train create a dampening effect which makes instantaneous measurement less responsive to fluctuations in flow. Second, mechanically actuated parts must be placed directly in the flow, which inhibits and restricts flow. Further, this results in clogging and deterioration of the mechanism due to the small amounts of oil and other contaminants that may be present in the flow and which accumulate over time. Third, there is wear of the gear train and bearings which results in a continually decreasing accuracy. Fourth, the liquid flow must be either stopped or rerouted around the turbine blades in order to service that portion of the meter residing within the liquid flow.

Some meters have been developed based upon laser Doppler technology, but these have been primarily used for wind flow measurements. Laser Doppler is a technology based on comparing the frequency shift of a pulsed electromagnetic beam reflected from a moving target to the frequency of the original pulsed beam. This frequency shift can be used to calculate both the direction and the speed of the target. This technique as applied to detect wind movement has severe limitations.

These devices require the presence of some particulate matter in the flow stream to cause backscatter of the electromagnetic beam. The presence of sufficient particulate matter in flow streams and other industrial process streams is questionable. As an example, where Doppler weather radar is employed to measure wind flow, when the air turns very cold and all moisture and particulate matter is precipitated, or "frozen out", there is no measurable Doppler velocity.

In addition, the laser beam cannot be perpendicular to the direction of flow and still detect Doppler motion. This means that for optimal detection, the Doppler beam must be as near "head-on" to the axis of flow as possible to detect maximum Doppler effect due to the velocity of the fluid. This requirement introduces problems associated with placing the detector invasively into the flow, because it is difficult to place the sensor in a pipe wall at an oblique angle.

Laser Doppler meters which use the backscatter technique experience a power reduction of $1/r^4$ at the receiver where r is the distance between the laser source and target. This basic physical limitation has tremendous implications on the power and size requirements of the Doppler sensor.

Finally, the detection of the Doppler effect requires Doppler analog filter banks or digital filter banks which are expensive and difficult to calibrate. The use of digital filter banks is more accurate because it eliminates the temperature variations found within analog components. However, the digital filter bank requires a sophisticated microprocessor or an Applications Specific Integrated Circuit (ASIC).

Another conventional electronic flow meter uses hot wire anemometer techniques. A thin film substrate containing a heating element and two resistors is placed intrusively in a gas flow. When current is passed through the heating element under conditions of fluid flow, the upstream resistor is cooled or maintains the temperature of the incoming flow, while the downstream resistor is heated due to the influence of the heating element. The voltage drops across the resistors are based upon their temperatures and are used by the meter's microprocessor to compute the flow against a pre-calibrated curve or table.

This technique does not work well for liquids because liquids are able to absorb such a large quantity of heat, that it is impossible to create a sufficient temperature differential with any reasonably sized heating element. Thus, hot wire anemometer devices are not suitable for a large portion of the flow meter market. In addition, a significant limitation is the required placing of the sensor intrusively in the gas flow with an energized and heated, electrical device and the attendant physical design and safety problems. Even though the power rating of the heating element is low, a safety hazard is posed if the gas is combustible and oxygen (air) is present. Again, this limits applicable marketability by eliminating its use in the natural gas or other combustible gas fields.

The Coriolis Effect is another technology upon which flow meters are based. This technology includes a manifold which diverts the flow of fluid from an inlet tube, through a loop of two parallel tubes, called flow tubes, and back into the manifold and then to a outlet tube. The two flow tubes are usually smaller than the inlet and outlet tubes, and loop in parallel over and back into the fitting. The flow tubes are vibrated at their natural frequency by an electromagnetic mechanism. This vibration sets up Coriolis forces within the flow tubes. These forces cause the two flow tubes to move away from each other. The magnitude of the separation of the flow tubes is proportional to the size of the forces generated, which is proportional to the flow rate of liquid.

There are several different means for detecting the slight separation between the flow pipes. Inductive magnetic devices may be used. However, these devices are difficult to make and thus expensive and are subject to temperature and EMF interference.

As an alternative, the placement of fiber optic cables looped between the flow pipes can be used to measure the separation of the flow pipes. This requires a light source, a three-way fiber optic beam splitter, a detector and various electronic components. The light source introduces laser or white light into a section of the fiber optic cable. This cable goes to the beam splitter which produces three output beams. One beam is used as a reference and the other two beams are introduced into two fiber cables that form two loops between the flow pipes. As the flow pipes move apart, the fiber optic loops are deformed which causes a change in the intensity of the light being transmitted along the fiber. The electronic components compare with the reference beam and the two flow pipe beams in order to calculate separation movement of the flow pipes which can be used to calculate the flow rate of the liquid in the flow pipes.

The Coriolis force meters are complicated in that they require fragile and customized plumbing components, sensitive electronic movement detectors or fiber optic cables, power supplies and light sources.

SUMMARY OF THE INVENTION

The laser-based forward scatter liquid flow meter device and method of the present invention measures the flow of a liquid by measuring the effect of that flow on a laser beam which travels from a laser source, through the flow, and impinges upon a detector oriented to receive the beam. The flow setup is accomplished through an optical section of a flow channel which may be of any cross sectional shape, and therefore presents no impeding structures in the flow stream. Because the scattering measurement is made with a light source directed into the flow of the fluid at a right angle, no special flow routing method need be employed to either re-route flow as in the Coriolis meter or to provide an oncoming relationship for directing light energy directly in the direction of flow.

Because the invention measures forward scatter, the power reduction at the detector is $1/r^2$ where r is the distance between the laser source and the detector. This major decrease in power loss means that more energy will reach the detector compared to methods which require forward scatter. Thus components needed to implement build the invention and utilize the technique can be smaller, less expensive and less complicated.

Because the only contact with the flowing stream is optical, the hazardous introduction of electrical conductors and heat into the flow stream is avoided.

The device and method of the present invention enables repair and replacement of the components of the meter system without interrupting or re-routing the flow. Due to the small space demand of the inventive system, the meters can enjoy multiple insertion adjacent to each other over a relatively short run of transparent pipe for purposes of redundancy or for comparative enhanced accuracy. Overall, the space required is so small that multiple meters may be installed in a relatively small area to maximize installation convenience and minimize excess electrical conductor runs. Because the output of the meter and system is electronic, it facilitates remote data gathering and monitoring.

BRIEF DESCRIPTION OF DRAWINGS

The invention, its configuration, construction, and operation will be best further described in the following detailed description, taken in conjunction with the accompanying drawings in which:

FIG. 4 is a graph showing correlation, based on least-squares analysis, of spectral frequency to flow rate of water.

DETAILED DESCRIPTION OF THE PREFERRED EMBODIMENT

Figure 1:
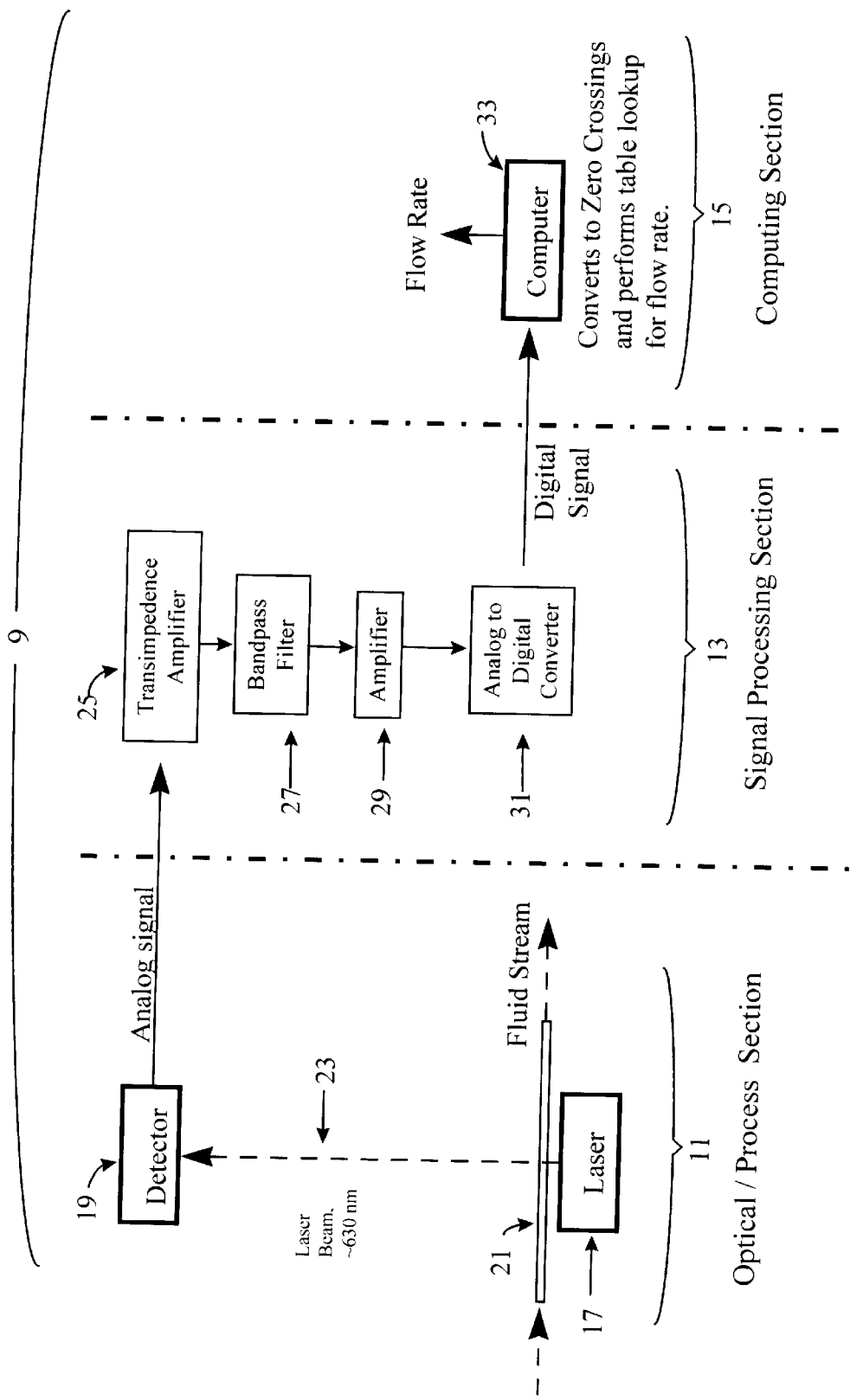
FIG. 1 is a block diagram of the experimental apparatus.

A laser-based forward scatter liquid flow meter device and method of the present invention, hereinafter referred to as meter 9, will be best described initially by reference to FIG. 1 which contains a schematic representation of one possible configuration of the invention. The schematic of FIG. 1 is divided by a pair of dashed vertical lines into, beginning from the left, an optical/process section 11, a signal processing section 13, and a computing section 15.

Referring to optical section 11, and beginning at the lower portion of the optical section 11, a laser 17 is located in optical alignment with a detector 19 and through a fluid stream 21. The schematic of FIG. 1 shows a fluid stream 21 without regard to a conduit in which flow may occur, since any conduit may be used to contain the flow so long as propagation of laser light through the stream is not significantly inhibited. Note that the detector 19, laser 17 and fluid stream 21, are oriented such that laser beam 23 is directed into the fluid stream 21 at substantially a right angle to the flow of the material in the fluid stream 21, with the detector oriented so as to receive the laser beam 23. The detector 19 is designed to produce an electrical current which is proportional to the overall energy received by the detector 19 from the laser beam 23.

Referring to the center of FIG. 1, the signal processing section 13 at the upper portion thereof, a transimpedance amplifier 25 has an input connected to the output of detector 19. The transimpedance amplifier 25 preferably generates a millivolt level signal as its output, which is in proportional to the input current level received from the detector 19. An audio bandpass filter 27 has an input connected to the output of the transimpedance amplifier 25. A signal directed through the audio bandpass filter 27 will have its direct current component eliminated. Preferably, the signal output from the audio bandpass filter 27 will have a frequency in the range of from about 1 Hz to about 50 KHz, depending on the flow rate of the fluid of fluid stream 21. The range of frequencies that the bandpass filter removes is chosen based on the particular noise and interference that a particular location experiences. There maybe installations in which the bandpass filter 27 is not needed at all.

An amplifier 29 has an input connected to the output of the audio band pass filter 27 and is preferably a high gain amplifier which will produces a 1 to 2 volt magnitude signal. Based on a particular installation and the noise and interference that installation experiences, the level of amplification generated by transimpedance amplifier 25 alone may be sufficient.

The output of the amplifier 29 is connected to an analog to digital converter 31. The upper limit of the bandpass filter 27 is partially selected based on the sampling rate of the analog to digital converter 31. If the frequency from the bandpass filter 27 is too high and above the rate that the analog to digital converter 31 can properly process, then data may be lost or inaccurate.

Analog to digital converter will preferably output a stream of digital data which correlates to the amount of energy from the laser beam 23 which reaches the detector 19. The data from the output of the analog to digital converter 31 thus be a digital representation of, the frequency of the scintillation.

It is understood, that all of the component descriptions of signal processing section 13, including the transimpedance amplifier 25, bandpass filter 27, amplifier 29 and analog to digital converter 31 as being individually identifiable and separable components may be equivalent to other functional components which may either subsume the components shown, or may combine one or more of the components shown.

Referring to the right side of FIG. 1, the computing section 15 includes a computer 33 having an input connected to the output of analog to digital converter 31. A digitized frequency signal received from the analog to digital converter 31 may be preferably treated and processed in the following manner. Where the signal is of varying positive magnitude, the computer 33 will select a threshold level directed to its operation as a zero-crossing detector. The threshold should be a level for which the signal is above the threshold 50% of the time and below the threshold 50% of the time for optimum performance. Once the threshold is selected, it is considered to be equivalent to a system having an positive and negative going signal which moves above and below the zero or middle point.

In reality, the middle point may not be zero, but it is the zero threshold operating point which best illustrates the class of technique which is being employed. By measuring the number of times the threshold is crossed, the frequency of the audio signal may be determined. The computed frequency, for a given diameter flow area, is proportional to the flow rate. A look-up table is created by calibrating the meter with a series of known flow rates and their corresponding scintillation frequencies. The ratio of the nearest known frequency to the measured frequency is used to interpolate the flow rate.

Theory

It may be helpful to examine the theory behind the schematic of FIG. 1 to promote a more complete understanding of the principles of operation of FIG. 1 and to illustrate the expanded range of possibilities for the remaining Figures.

Forward scatter techniques are based not upon the reflection or bouncing back of an energy beam from a flow stream, but upon the alteration the path of the beam as it travels from a source to a receiver. Forward scatter depends on the refraction of the incoming energy based upon minute refraction interfaces caused by small regions of turbulence within the flow. As these interfaces move with the flow, portions of the energy beam are alternately refracted and non-refracted. This results in rapid fluctuations in the amount of energy from the laser beam reaching the detector. This phenomenon is called scintillation. Scintillation, for example causes the stars in the night sky to appear to twinkle. Turbulence in the air flow in the atmosphere between the star and the observer causes the light from the star to refract and deflect away from the observer and then, as the turbulence moves beyond the line of sight of the observer, the light returns to its normal path and is again seen by the observer.

The previous methods of detecting flow rate by forward scatter, have been inadequate because the mathematics used to calculate the flow rate were very complicated and time consuming to perform. These methods of determining flow rates required a Fourier transform on the incoming signal from the detector and then using the spectral power density to determine the rate. These methods measured the increasing frequency shift as the flow rate increased. However, as the frequency peak shifts it also broadens requiring the use of several spectral moments to identify the flattened peak.

The core idea of using the laser beam to measure flow velocities is to determine the frequency broadening of the power spectral density as referenced by a known flow rate. The actual measure of the frequency broadening will be the average frequency of the power spectral density.

This prior known method of calculating flow by analyzing the scintillation patterns by Fourier transforms is complicated to understand and difficult to implement by computer, both from a hardware and a software perspective.

Figure 2:
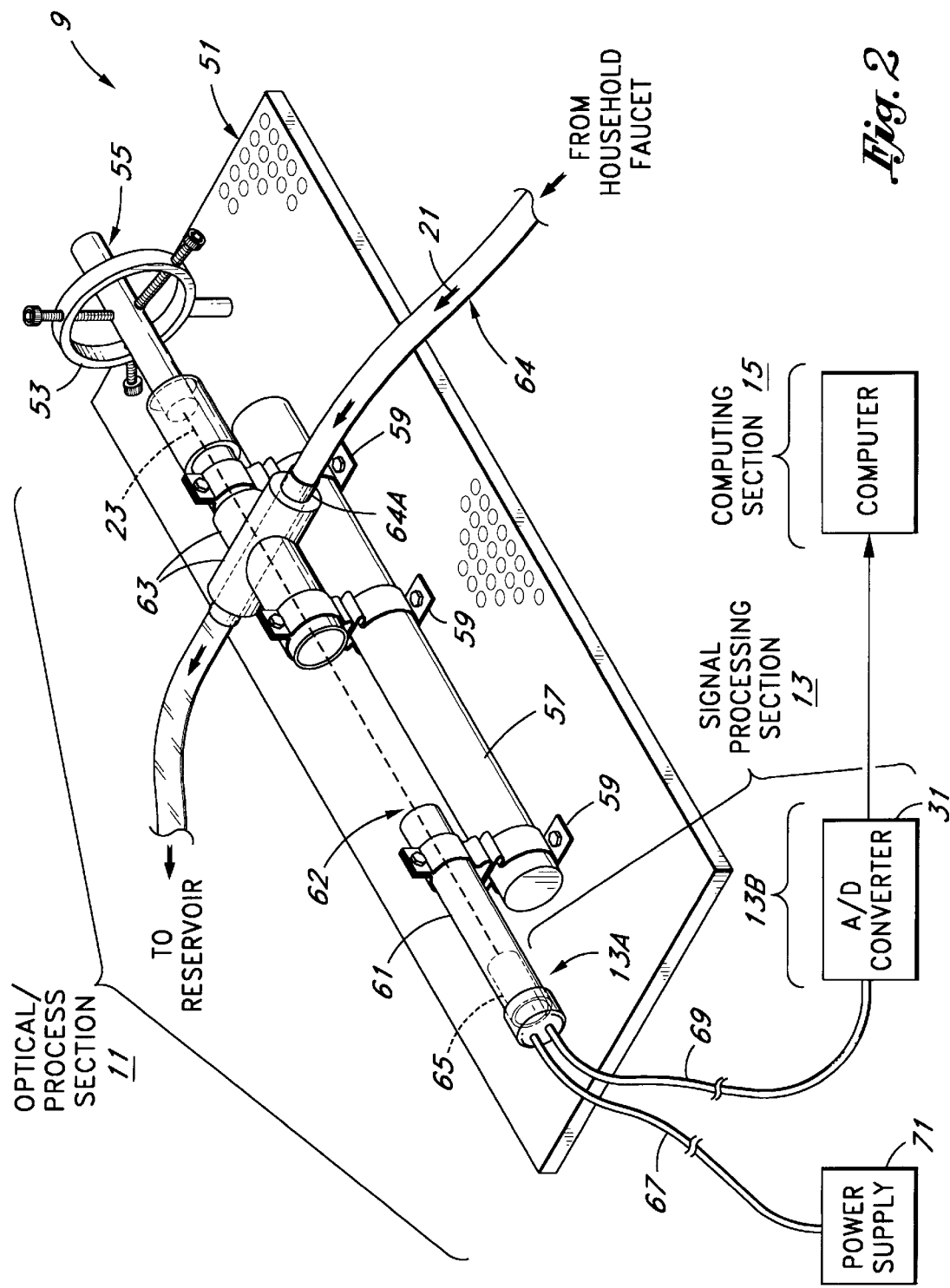
FIG. 2 is a drawing of the preferred embodiment.

Returning to the Figures, and particularly to FIG. 2, one physical embodiment of the meter 9 of the invention is shown. A platform 51 is used to support a set of more specific structures than were shown in FIG. 1. At the upper end of the platform 51, a ring stand 53 is used to support a commercially available pen laser 55.

Along the center of the platform 51 a pipe 57 is supported by the platform 51, and a series of pipe clamps 59 are used to enable longitudinally adjustable support to be obtained from the pipe 57. Atop one or more of the pipe clamps 59, a light tube 61 is secured at the lower end of the platform 51. Atop one of more of the remaining pipe clamps 59, is secured optical fitting 63 which facilitates the introduction of light from the laser pen 55 into a fluid stream 21 which was illustrated in FIG. 1. Optical fitting 63 is connected to tubing 64 which facilitates the flow of liquid through the fitting and it is the flow of liquid which is to be measured. The fitting 63 may have an opening of known cross sectional area, or the tubing 64 may simply be a clear or translucent tubing, with the optical fitting 63 intended to stabilize and support the tubing 64. In addition, a static mixer or hydrofoil 64A may be employed. Hydrofoil 64 may be supported by the optical fitting 63 and or tubing 64. The hyrofoil 64A provides turbulent mixing of the liquid upstream of the optical fitting 63 and increases the turbulence expected to be measured by the meter 9 of the present invention.

Optical fitting 63 helps to shield the fluid stream 21 from ambient light at the point that laser beam 23 passes through fluid stream 21. In addition, optical fitting 63 retains fluid stream 21 in rigid optical alignment with laser beam 23 to reduce fluctuations in the strength of laser beam 23 impinging on fluid stream 21 due to vibrations from external sources. Laser beam 23 exits from optical fitting 63 and travels through and air gap 62 to the first end of light tube 61. At the second end of the light tube 61, a sensor device 65 is inserted into the light tube in order to provide for isolation, support and stability. In the setup shown in FIG. 2, the sensor device 65 includes the detector 19 and transimpedance amplifier 25 which was illustrated in FIG. 1.

The sensor device 65 has a pair of electrically conductive leads 67 and 69. Lead 67 is connected to a power supply 71. Lead 69 is connected to the analog to digital converter 31, which was illustrated in FIG. 1. The analog to digital converter is then connected to the computing section 15.

As before, computing section 15 can be any device ranging from a programmable computer 33 to a dedicated microprocessor specific to its intended usage. Light tube 61 is located along tube 57 such that the optical path length is fifty (50) inches. The path length could be comprised entirely of fluid stream 21, providing for a fluid stream with a width of fifty (50) inches. A fluid stream 21 with a width of about 50 inches would result in an equal or greater frequency of scintillation than a smaller width fluid stream. The increase in the frequency of scintillation would be caused by greater number of refractive interfaces that laser beam 23 would pass through in fluid stream 21 before reaching the sensor device 65.

Laser pen 55 employs an ordinary, red wavelength, laser diode which generates a beam frequency in the range of from about 630 nanometers to about 670 nanometers and which requires less than 5 milliwatts of power.

Within the sensor device 65, a current signal is produced in proportion to the received light, and the transimpedance amplifier within the sensor device 65 converts the current signal into a voltage signal.

Figure 3:
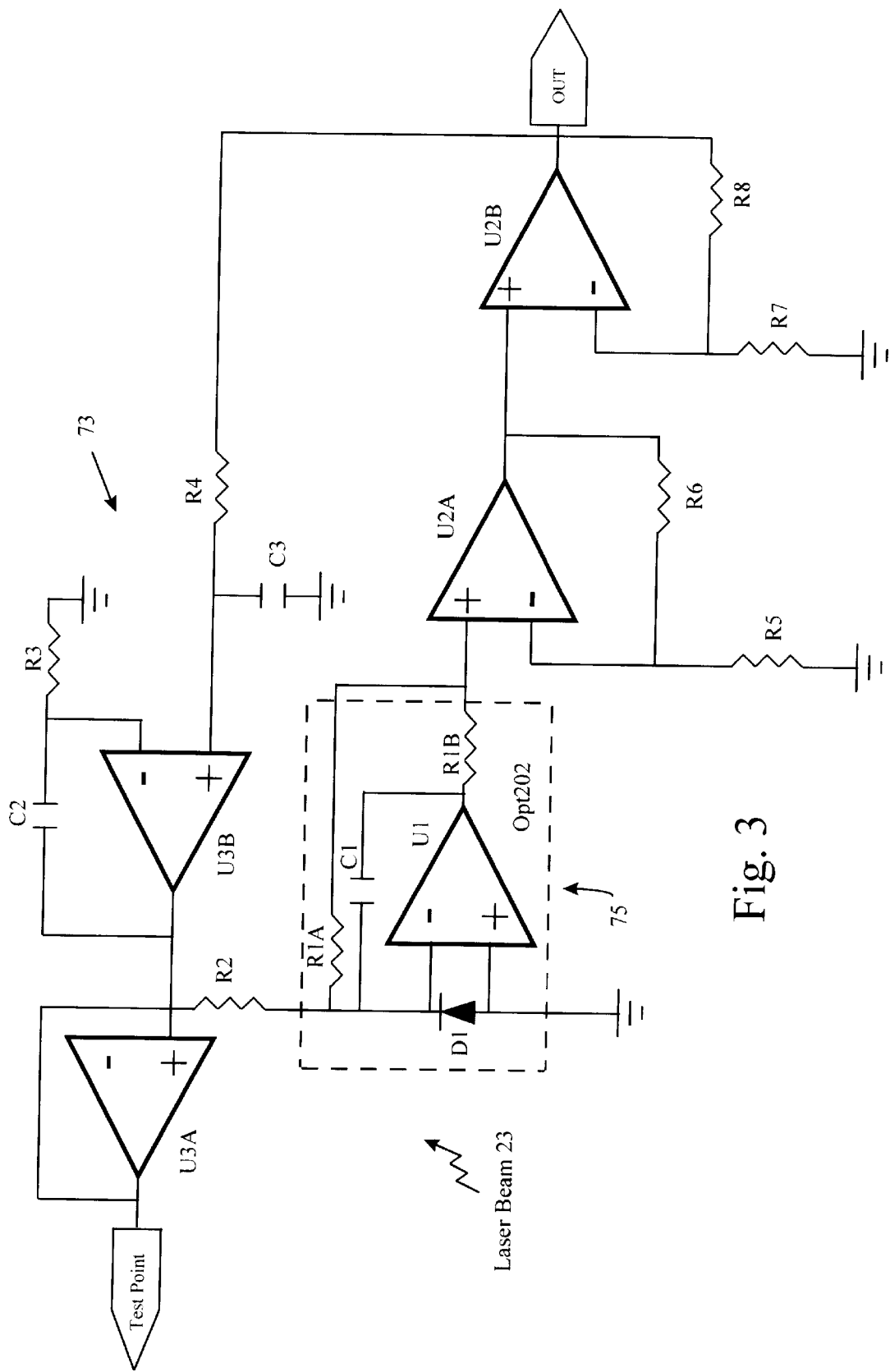
FIG. 3 is a block diagram of the detector, amplifier and bandpass filter circuits.

One possible configuration for the signal processing portion 13, shown in FIG. 1, includes a first signal processing section 13A located within sensor device 65 and a second signal processing section 13B. First signal processing section 13A, part of circuit 73, shown in FIG. 3, is the transimpedance amplifier 25 shown in FIG. 1. The second signal processing section 13B is analog to digital converter 31.

The detailed circuit 73, in it physical realization includes a device commercially available and known as an Opt202 and is obtainable from Burr-Brown company and is shown in a dashed line format as package 75. Portions of the circuit 73 outside of the dashed line are helpful in the stable operation of the circuit 73. Package 75 is thus available as a single component and combines the function of Detector 19 and transimpedance amplifier 25.

Package 75 contains the components photodiode D1, resistors R1A and R1B, capacitor C1, operational amplifier U1 in the following configuration. The photodiode D1 is connected to ground and the non-inverting input of operational amplifier U1. The other side of photodiode D1 is connected to the inverting input of operational amplifier U1, to capacitor C1, resistor R1A and resistor R2. The connection of the other side of resistor R2, which is not part of the Opt202 device, will be described later. The photodiode D1 is oriented to allow current to flow only from the non-inverting to the inverting input of operational amplifier U1. The output of operational amplifier U1 is connected to resistor R1B and the other side of capacitor C1. The other side of resister R1B is connected to the non-inverting input of operational amplifier U2A, and the other side of resistor R1A.

The non-inverting input of operational amplifier U2A is connected to resistor R5 and resistor R6. The other side of resistor R5 is connected to ground. The other side of resistor R6 is connected to the output of operational amplifier U2A and the non-inverting input of operational amplifier U2B.

The non-inverting input of operational amplifier U2B is connected to resistor R7 and resistor R8. The other side of resistor R7 is connected to ground. The other side of resistor R6 is connected to resistor R4. The output of operational amplifier U2B is connected to the analog to digital converter 27, which is not part of this figure. Operational amplifier U2A and U2B form a standard amplification circuit which provides additional amplification beyond that provided by U1.

The other side of resistor R4 is connected to capacitor C3 and the non-inverting input of operational amplifier U3B. The other side of C3 is connected to ground. The inverting input of operational amplifier U3B is connected to resistor R3 and capacitor C2. The other side of resistor R3 is connected to ground. p The other side of capacitor C2 is connected to the output of operational amplifier U3B and the non-inverting input of operational amplifier U3A. The inverting input of operational amplifier U3A is not connected. The output of operational amplifier U3A is connected to the other side of resistor R2, described earlier and to the voltage source. Not shown are the standard V+ and V− connections for the various integrated circuits U3A, U3B, U1, U2A and U2B.

Operation

With regard to the operation of the meter 9 of FIGS. 1–3, a liquid flow is introduced through tubing 64 of FIG. 2, as fluid stream 21 shown in FIG. 1. The pen laser 55 propagates a laser beam 23 through the fitting 63 and through the optical tube 61 to the sensor device 65. A signal from the sensor device 65 passes through the conductor 69, and the signal treated in accord with the components shown in the optical/process section 11 and signal processing section 13 of FIG. 1.

With regard to FIG. 1, the signal from the detector 19 is passed as an analog signal in the 1 Hz to 50 KHz range. This signal is then amplified by transimpedance amplifier 25, having a potential in the 1 to 3 volt range. The 1 to 3 volt signal is then received by the analog to digital converter 31 and is digitized by analog to digital converter 31. The analog to digital converter 31 may preferably be an Allison Technology O-Scope Ip PC based analog to digital converter (ADC).

The computing section 15 receives the digital signal from analog to digital converter 31 and captures the digital data in a computer 33, which for example may be an IBM PC compatible computer. The data file may be processed using an Excel spreadsheet to compute transitions with respect to a threshold which may be thought of as the plus-to-minus and minus-to-plus transitions. This process can easily be performed on a dedicated circuit housed in a common housing.

The meter 9 may be calibrated as follows. Water can be used to pass directly in front of the laser carried in a clear ¼" plastic tube which is fed by an ordinary household faucet, so long as the liquid to be measured correlates well with water in terms of its scattering effect. The water may be collected downstream in a known volume container. By measuring the time to fill the container to a known volume, the water flow rate may be computed, for example, in gallons per hour. Once the water flow rate is established, readings are taken for that flow rate. Several different flow rates are measured. This data is used as the calibration data.

The pen laser will be aligned so that the optimum signal to noise ratio is established. This often means the beam may be focused somewhat off-center from the physical center of the detector. Dead center alignment often results in too much energy reaching the detector which results in over-saturation.

Referring to Table I below, data was gathered for the three flow rates indicated in the first column. The scintillation frequency for each of the three flow rates was measured and is shown in the second column. The three sets of paired data are then processed by least-squares method to generate an linear equation of best fit. By utilizing the equation of best fit, it is possible to calculate the theoretical scintillation frequency values for each of the three flow rates that were actually tested. The three calculated values are shown in the third column. The deviation, between the actual measured values and the values calculated by the least-squares method is determined and expressed as a percentage and shown in the fourth column.

In actual use, scintillation frequencies for fluid streams having unknown flow rates would be measured by utilizing meter 9. Then the flow rate would be calculated from the line of best fit that was previously determined for a fluid have similar characteristic to that of the fluid having the unknown flow rate.

TABLE I

Experimentally Derived Flow Rates

| Flow Rate (gph) | Measured ($S_f$) Hz | Calculated ($S_f$) Hz | Deviation |
|---|---|---|---|
| 26 | 3185.714 | 3262.981 | −2.4% |
| 37 | 3593.143 | 3505.117 | 2.4% |
| 116 | 5233.333 | 5244.092 | −0.2% |

Referring to FIG. 4, a graph based upon the data shown in Table 1 is presented. The three diamond symbols indicate the scintillation frequencies that were measured for the three flow rates. The solid line is a representation of the line of best-fit based upon a least squares analysis of the data in the first two columns of Table 1.

Scintillation is only expected when turbulence exists in the flow., Thus, if the liquid flow is too slow, no turbulence is detected. When flow rate measurement is desired in pipes or tubing where laminar flow is present a passive mechanical hydrofoil or static mixer can be used to induce turbulence in the flow just upstream of the laser beam to insure maximum turbulence and scintillation, for a given volume of flow.

The turbulence inducing structure can be designed using the Reynold's number of the liquid, temperature, pressure, pipe diameter and desired flow rate measurement range as principal parameters.

While the present invention has been described in terms of a device and method for measuring fluid flow by its scintillation aspect, one skilled in the art will realize that the structure and techniques of the present invention can be applied to many similar devices. The present invention may be applied in any situation where a non-invasive measurement is to be made of a flowing fluid to correlate an optical effect with the flow rate.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

I claim:

1. A device for the measurement of flow rate of a liquid by measuring the turbulence induced scintillation effect of the liquid comprising:

a means for generating a laser beam;

a detector sensitive to said laser beam which outputs a varying electrical signal in response to the magnitude of said laser beam;

a flow structure having an inlet fitting for receiving the liquid, an outlet fitting for discharging the liquid and a first portion for receiving and translucent to said laser beam;

a support member supporting said means for generating a laser beam and said detector, said detector in a position to receive said laser beam propagated through said first portion of said flow structure; and a converter for receiving said varying electrical signal and which outputs an indication of flow rate by computing a frequency of said varying electrical signal and computing the flow rate by correlating said computed frequency to the frequencies associated with known flow rates.

2. The device for the measurement of flow rate as recited in claim 1 and wherein the first portion of the flow structure is cylindrical.

3. The device for the measurement of flow rate as recited in claim 2 wherein the first portion of the flow structure has a diameter of between about 0.125 inches to about 50 inches.

4. The device for the measurement of flow rate as described in claim 1 wherein the first portion of the flow structure is square.

5. The device for the measurement of flow rate as described in claim 4 wherein the first portion measures from about 0.125 inches to about 50 inches wide.

6. The device for the measurement of flow rate as described in claim 1 wherein said means for generating a laser beam is for generating a laser beam having a frequency from about 630 nanometers to about 670 nanometers.

7. The device for the measurement of flow rate as described in claim 1 wherein said means for generating a laser beam consumes power at the rate of about five milliwatts.

8. The device for the measurement of flow rate as described in claim 1 wherein the detector is located at a distance of from about ten inches to about fifty inches from said first portion of said flow structure.

9. The device for the measurement of flow rate as described in claim 1 and further comprising a hydrofoil located in said inlet of said flow structure.

10. A method for measuring a flow rate of a liquid by measuring the turbulence induced scintillation effect of the liquid comprising the steps of:

propagating a laser beam through the liquid;

generating a varying electrical signal having a magnitude proportional to the intensity of said laser beam, after propagation of said laser beam through the liquid;

computing a frequency of said varying electrical signal; and computing the flow rate by correlating said computed frequency to the frequencies associated with known flow rates.

11. The method for measuring a flow rate of a liquid as described in claim 10, wherein the step of computing a frequency comprises the step of:

computing a frequency of said varying electrical signal based upon at least one of plus-to-minus and minus-to-plus transitions of said varying electrical signal per unit of time to form a computed frequency; and computing the flow rate by correlating said computed frequency to the frequencies associated with known flow rates.

12. The method for the measurement of the flow rate of a liquid as described in claim 11 wherein said laser beam is propagated at a wavelength of from about 630 nanometers to about 670 nanometers.

13. The method for the measurement of a flow rate of a liquid as described in claim 11 wherein said laser beam is produced by consumption of power at the rate of about five milliwatts.

* * * * *